June 9, 1936. B. W. DEZOTELL 2,043,530
WATER LEVEL CONTROLLER
Filed Aug. 7, 1934
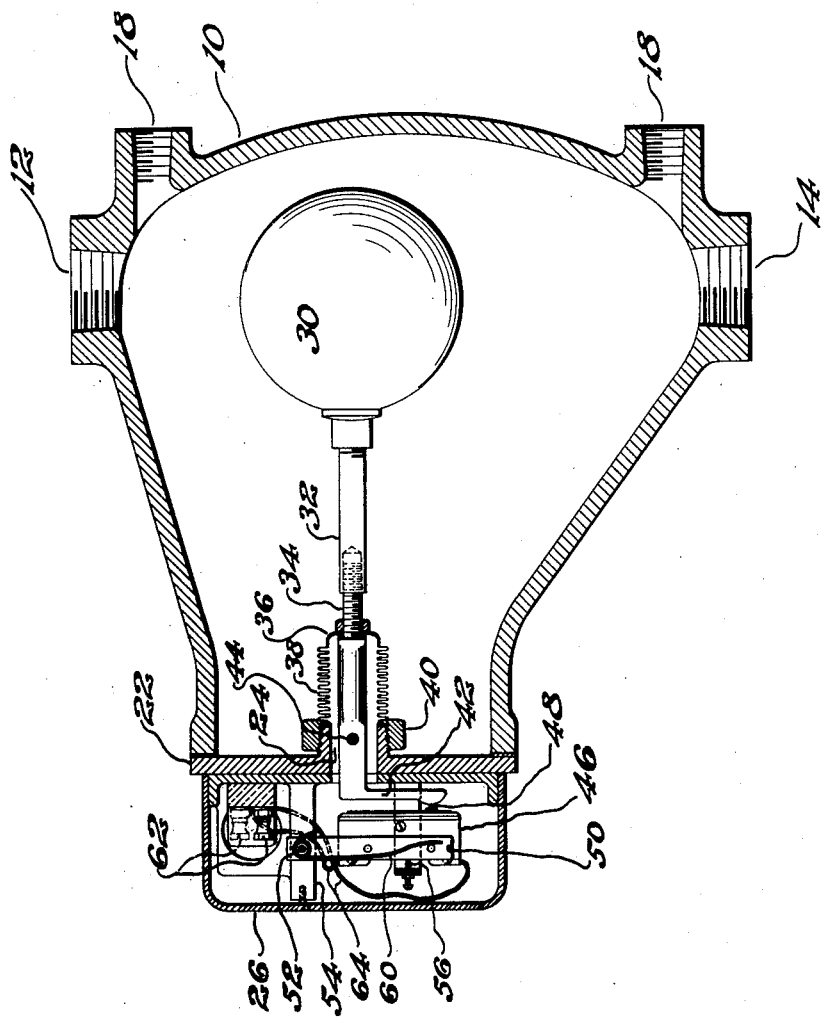
Witness
Paul F. Bryant
Inventor
Bernard W. Dezotell
by Fish Hildreth
Cary & Jenney Attys Patented June 9, 1936

2,043,530

UNITED STATES PATENT OFFICE 2,043,530

WATER LEVEL CONTROLLER

Bernard W. Dezotell, West Roxbury, Mass., assignor to United Electric Controls Company, Boston, Mass., a corporation of Massachusetts Application August 7, 1934, Serial No. 738,786

1 Claim. (Cl. 200—84)

The present invention relates to switching devices controlled by water level, and is more particularly concerned with limit controls designed for employment in oil fire heating systems and the like.

The purpose of the invention is to provide a simple and effective form of control for this purpose, which shall be reliable in its operation and controlled within small variations of water level. With this and similar objects in view, the various features of the invention consist in certain novel features of construction, combinations and arrangements of parts hereinafter described and claimed, the advantages of which will be obvious to those skilled in the art from the following description.

The accompanying drawing illustrates a longitudinal section in elevation of the complete unit.

Referring more particularly to the illustrated embodiment of the invention, it will be noted that it is provided with a float housing 10 having provision for connection to the steam and water spaces at 12 and 14, respectively. The housing is also threaded for the attachment of a gauge glass at 18. At its smaller end the housing is attached to a plate 22 having an opening 24 formed therein for the passage of the operating arm. The switch housing indicated at 26 is secured to the opposite side of the plate in alignment with the float housing.

Located within the housing 10 is a hollow ball float 30 supported at the outer end of a float arm 32 which in turn is connected to a threaded stem 34 hermetically sealed to the head 36 of a bellows seal 38. The bellows seal is hermetically sealed at its opposite end to a head 40. The stem 34 passes through the head 36 and extends longitudinally of the interior of the bellows and through the opening 24 into the switch housing, terminating in an operating arm 42. The stem is pivoted at 44, and in conjunction with the arm 42 forms in effect a bell crank lever pivoted at 44. Rising and falling movements of the float cause inward and outward movements of the arm 42 about this pivot. Due to the location of the pivot beyond the end of the bellows seal, these rising and falling movements cause uniform distortion of the bellows folds and insure long life. The bellows serves the function of sealing the water and steam space within the float chamber from the switch unit, while permitting the necessary rising and falling movements of the float to control the switch.

An electric switch unit indicated at 46 is of the self-contained type, comprising a housing within which is mounted a spring switch member operated through a projecting contact pin 48. The switch unit proper is secured along one side to an arm 50 pivoted at 52 upon a support 54. The unit is normally retained in contact with an adjustable abutment 56 by a bowed spring 60, all as indicated in the drawing. By pivotally adjusting the free end of the switch unit through the abutment, the operating level at which the switch operates may be properly controlled and varied as desired. The switch unit is electrically connected to terminals 62 through leads 64.

What is claimed is:—

A water level controller comprising a float housing, a switch housing at one end of the float housing, a partition separating the two housings and having an opening therethrough, a float arm pivotally mounted in the partition opening, a float on the free end of the arm, a bellows connected at one end of the arm and at the opposite end of the partition to seal the opening, an operating extension on the float arm extending generally parallel with the partition, a self-contained switch unit pivotally mounted within the housing and generally parallel to the partition, a projecting operating pin located adjacent the free end of the operating extension, and means for adjusting the switch unit about the pivot with relation to the operating extension.

BERNARD W. DEZOTELL.